US007287826B2

(12) United States Patent
Aldrich et al.

(10) Patent No.: US 7,287,826 B2
(45) Date of Patent: Oct. 30, 2007

(54) METHOD OF PERFORMING DYNAMIC PRINTHEAD MAINTENANCE FIRING IN AN INK JET PRINTER

(75) Inventors: Charles Stanley Aldrich, Nicholasville, KY (US); Marc Alan Herwald, Lexington, KY (US); Martin Alan Johnson, Winchester, KY (US)

(73) Assignee: Lexmark International, Inc., Lexington, KY (US)

(*) Notice: Subject to any disclaimer, the term of this patent is extended or adjusted under 35 U.S.C. 154(b) by 229 days.

(21) Appl. No.: 10/735,368

(22) Filed: Dec. 12, 2003

(65) Prior Publication Data

US 2005/0128226 A1 Jun. 16, 2005

(51) Int. Cl.
*B41J 2/165* (2006.01)
*B41J 29/38* (2006.01)
*G06F 15/00* (2006.01)

(52) U.S. Cl. .............................. 347/35; 347/5; 347/36; 358/1.8

(58) Field of Classification Search .................. 347/23, 347/35
See application file for complete search history.

(56) References Cited

U.S. PATENT DOCUMENTS 3,925,788 A * 12/1975 Kashio ........................ 347/23
4,453,166 A * 6/1984 Enoto ......................... 347/171
5,528,269 A * 6/1996 Drogo et al. ................. 347/19
5,659,342 A 8/1997 Lund et al.
5,850,237 A 12/1998 Slade
5,903,288 A 5/1999 Yamaguchi
6,166,828 A 12/2000 Yamada et al.
6,179,403 B1 1/2001 Xie et al.
6,276,778 B1 8/2001 Katayama
6,283,577 B1 * 9/2001 Kosaka et al. ................ 347/35
6,293,646 B1 9/2001 Beachnau Hood et al.
6,352,333 B1 3/2002 Matsumoto et al.
6,523,932 B2 2/2003 Johnson
6,554,392 B2 * 4/2003 Vega et al. ................... 347/23
6,631,976 B2 * 10/2003 Hamamoto et al. ........... 347/35
6,663,216 B2 * 12/2003 Kanaya ....................... 347/23
6,830,311 B2 * 12/2004 Fukasawa et al. ............ 347/29
6,974,201 B2 * 12/2005 Kanemura ................... 347/23
2002/0054185 A1 5/2002 Kinoshita
2003/0214659 A1 * 11/2003 Niimura ..................... 358/1.8
2005/0231537 A1 * 10/2005 Momose ........................ 347/9
2005/0275683 A1 * 12/2005 Furuichi et al. .............. 347/35

* cited by examiner

*Primary Examiner*—Matthew Luu
*Assistant Examiner*—Shelby Fidler
(74) *Attorney, Agent, or Firm*—Taylor & Aust, P.C.

(57) ABSTRACT

A method of performing printhead maintenance firing in an ink jet printer that has a printhead carrier that carries an ink jet printhead, the ink jet printer having a waste ink receptacle, includes the steps of decelerating the printhead carrier from a first velocity after printing print data; and controlling a firing of the printhead during the decelerating in accordance with maintenance data so that ink droplets ejected from the printhead during the decelerating are received by the waste ink receptacle.

6 Claims, 5 Drawing Sheets

METHOD OF PERFORMING DYNAMIC PRINTHEAD MAINTENANCE FIRING IN AN INK JET PRINTER

BACKGROUND OF THE INVENTION

1. Field of the Invention

The present invention relates to an ink jet printer, and, more particularly, to a method of performing dynamic printhead maintenance firing in an ink jet printer.

2. Description of the Related Art

An inkjet printer uses printhead spit maintenance, i.e., periodic maintenance firing for the printheads, to maintain the printhead ink jetting nozzles open or clear of debris during a print job. The periodic firing is designed for the printhead to fire into a fixed location at a predetermined time interval. Typically, all of the nozzles for the particular printhead are firing simultaneously regardless of previous usage.

In one such ink jet printer, for example, during printhead spit maintenance the printhead is moved by the carrier to the fixed location, and the carrier remains stationary, i.e., static, as the printhead fires into the fixed location. The fixed location may be, for example, an open waste ink reservoir, a waste ink collection surface, or a foam filled spit tower, positioned outside the print zone of the printer. Since the carrier must come to a complete stop using this static method, the carrier must be allowed to complete its deceleration ramps before stopping. To prevent the carrier from traveling past the fixed location, the printer width must be wide enough to accommodate the deceleration ramps. If the printhead is allowed to travel past the fixed location, then the carrier must move back to the correct position, and then reposition to accommodate the appropriate acceleration ramp for printing. Such extra moves slow down the time it takes to complete a print job.

What is needed in the art is a method to perform dynamic printhead maintenance firing in an ink jet printer, which accommodates maintenance firing at a fixed location without having to stop the motion of the carrier.

SUMMARY OF THE INVENTION

The present invention provides a method to perform dynamic printhead maintenance firing in an ink jet printer, which accommodates maintenance firing at a fixed location without having to stop the motion of the carrier.

The invention, in one form thereof, relates to a method of performing printhead maintenance firing in an ink jet printer that has a printhead carrier that carries an ink jet printhead, the ink jet printer having a waste ink receptacle. The method includes the steps of decelerating the printhead carrier from a first velocity after printing print data; and controlling a firing of the printhead during the decelerating in accordance with maintenance data so that ink droplets ejected from the printhead during the decelerating are received by the waste ink receptacle.

In another form thereof, the present invention relates to a method of performing printhead maintenance firing in an ink jet printer that has a printhead carrier that carries an ink jet printhead, the ink jet printer having a waste ink receptacle. The method includes the steps of receiving print data in a form of print data segments; generating a timing segment and a maintenance segment; appending the timing segment and the maintenance segment to the print data segments; accelerating the printhead carrier to a first velocity; serializing the print data segments, the timing segment, and the maintenance segment to the printhead; decelerating the printhead carrier during the maintenance segment; and controlling a firing of the printhead in accordance with data in the maintenance segment so that ink droplets ejected from the printhead during the decelerating are received by the waste ink receptacle.

An advantage of the present invention is that the width of the printer may be shortened, thereby reducing the overall cost of the printer.

Another advantage of the present invention is the elimination of the need to stop the carrier when performing printhead spit maintenance at a fixed location.

Yet another advantage of the present invention is that it improves the throughput during printing, thereby reducing print time.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate an embodiment of the invention, in one form, and such exemplifications are not to be construed as limiting the scope of the invention in any manner.

DETAILED DESCRIPTION OF THE INVENTION

Figure 1:
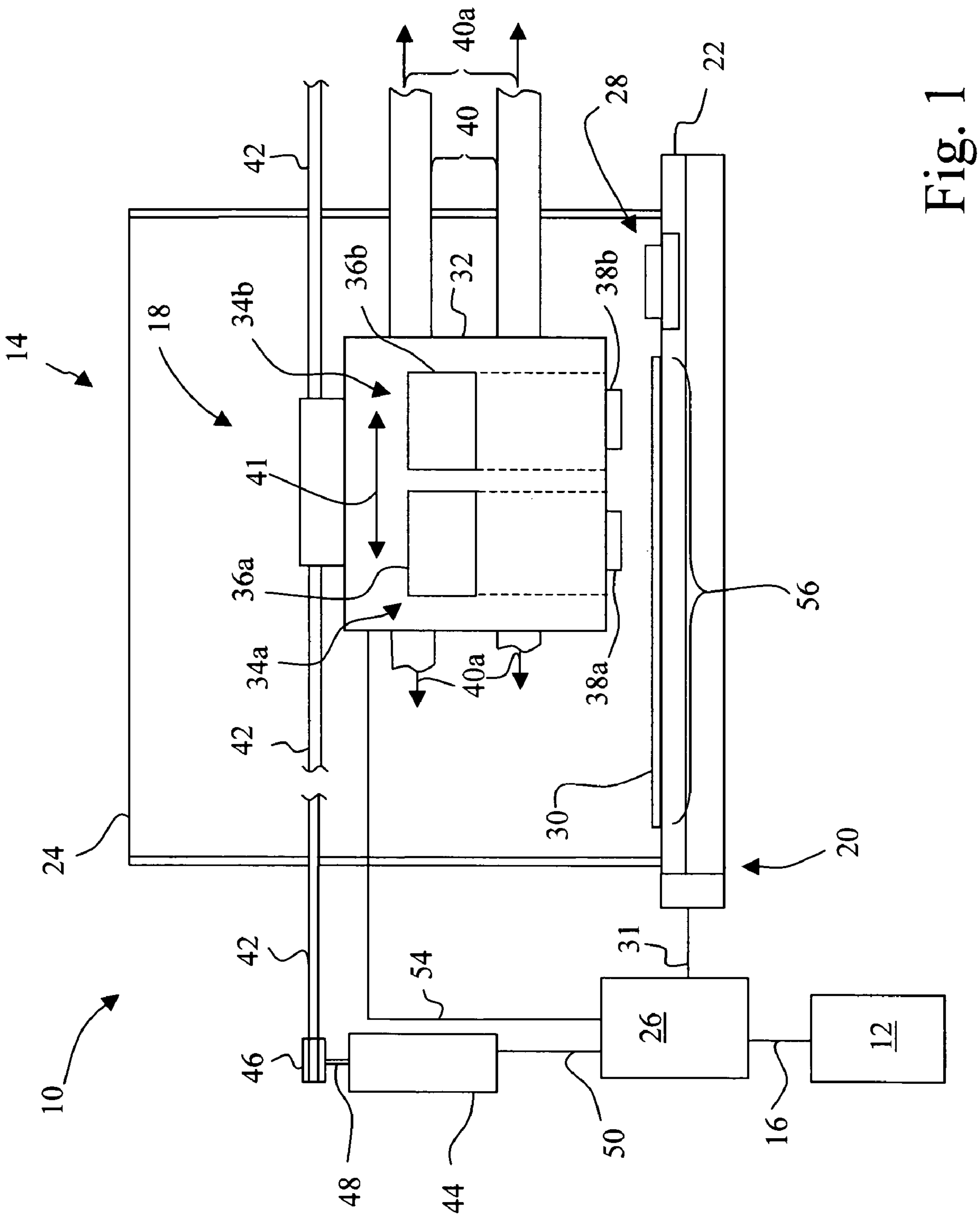
FIG. 1 is a diagrammatic representation of an imaging system employing an embodiment of the present invention.

Referring now to the drawings and particularly to FIG. 1, there is shown an imaging system 10 employing an embodiment of the present invention. Imaging system 10 includes a host 12 and an imaging apparatus in the form of an ink jet printer 14. Host 12 is communicatively coupled to ink jet printer 14 by way of communications link 16. Communications link 16 may be, for example, a wired connection, a wireless connection, such as an optical or r.f. connection, or a network connection, such as an Ethernet Local Area Network.

Host 12 may be, for example, a personal computer of a type that is well known in the art, and includes a monitor to display graphics or text, an input device such as a keyboard and/or mouse, a microprocessor and associated memory, such as random access memory (RAM), read only memory (ROM) and a mass storage device, such as CD-ROM or DVD hardware. Resident in the memory of host 12 is printer driver software. The printer driver software places print data and print commands in a format that can be recognized by ink jet printer 14.

Ink jet printer 14 includes a printhead carrier system 18, a feed roller unit 20, a mid-frame 22, a media source 24, a controller 26 and a waste ink receptacle 28. Waste ink receptacle 28 may be located, for example, on or adjacent to mid-frame 22. Also, ink jet printer 14 may serve as the printing mechanism in a multi-function apparatus, such as an apparatus capable of performing copying and faxing, in addition to printing.

Media source 24 is configured and arranged to supply from a stack of print media a sheet of print media 30 to feed roller unit 20. Feed roller unit 20 in turn further transports the sheet of print media 30 during a printing operation, under the control of controller 26, via a communications link 31.

Printhead carrier system 18 includes a printhead carrier 32 that carries, for example, one or more printhead cartridges, such as a monochrome printhead cartridge **34*a* and/or a color printhead cartridge 34*b*, that is mounted thereto. Monochrome printhead cartridge 34*a* includes a monochrome ink reservoir 36*a* provided in fluid communication with a monochrome ink jet printhead 38*a*. Color printhead cartridge 34*b* includes a color ink reservoir 36*b* provided in fluid communication with a color ink jet printhead 38*b*. Alternatively, ink reservoirs 36*a*, 36*b* may be located off-carrier, and coupled to respective ink jet printheads 38*a*, 38*b* via respective fluid conduits. Also, alternatively, monochrome printhead cartridge 34*a*** may be replaced by a photo printhead cartridge that may include additional ink colors and/or formulations.

Printhead carrier 32 is guided by a pair of guide members 40. Either, or both, of guide members 40 may be, for example, a guide rod, or a guide tab formed integral with a frame portion of ink jet printer 14. The axes **40*a* of guide members 40 define a bi-directional scanning path 41 of printhead carrier 32. Printhead carrier 32 is connected to a carrier transport belt 42 that is driven by a carrier motor 44 via a carrier pulley 46. Carrier motor 44 has a rotating motor shaft 48 that is attached to carrier pulley 46. In this manner, carrier motor 44 is drivably coupled to printhead carrier 32, although one skilled in the art will recognize that other drive coupling arrangements could be substituted for the example given, such as for example, a worm gear drive. Carrier motor 44 can be, for example, a direct current motor or a stepper motor. Carrier motor 44 is coupled, e.g., electrically connected, to controller 26 via a communications link 50**.

Ink jet printheads **38*a*, 38*b* are electrically connected to controller 26 via a communications link 54. Controller 26 supplies electrical address and control signals to ink jet printer 14, and in particular, to ink jet printheads 38*a*, 38*b* to selectively fire the ink jetting actuators of ink jet printheads 38*a*, 38*b*, so as to effect the selective ejection of ink from ink jet printheads 38*a*, 38*b*. Such selective firing of the ink jetting actuators of ink jet printheads 38*a*, 38*b*** may occur during normal printing, and may occur during the dynamic printhead maintenance operation of the present invention.

At a directive of controller 26, printhead carrier 32 is transported in a controlled manner along bi-directional scanning path 41, via the rotation of carrier pulley 46 imparted by carrier motor 44, in a reciprocating manner. The reciprocation of printhead carrier 32 transports ink jet printheads **38*a*, 38*b* across the sheet of print media 30 along bi-directional scanning path 41 to define a print zone 56 of ink jet printer 14. The width of print zone 56 corresponds generally to the width of the sheet of print media 30. Accordingly, waste ink receptacle 28 may be formed, for example, by an open waste ink reservoir, a waste ink collection surface, or a foam filled spit tower, that is positioned outside print zone 56 along mid-frame 22 of ink jet printer 14**.

In order to conduct dynamic printhead maintenance firing in accordance with the present invention, controller 26 controls the movement of printhead carrier 32 to dynamically position printhead carrier in relation to waste ink receptacle 28. In other words, while waste ink receptacle 28 may be at a fixed location, the printhead maintenance firing of ink jet printheads **38*a* and 38*b* will be performed while printhead carrier 32 is in motion, and more particularly, during the deceleration ramp of printhead carrier 32**, as more fully described below.

At some printing interval, it will be determined that at least some of the nozzles of one or both of ink jet printheads **38*a*, 38*b* are to undergo a dynamic printhead maintenance firing, i.e., spitting, operation in accordance with the present invention, wherein ink is selectively ejected by at least some of the nozzles of the ink jet printhead to maintain the nozzles in proper working order. Such a printing interval may be, for example, a timed interval initiated at the beginning of a print job, or may be based on an idle time of one or more of the nozzles of ink jet printheads 38*a* or 38*b*. In one embodiment of the present invention, for example, all of the nozzles of a particular printhead, such as monochrome printhead 38*a* or color printhead 38*b*, will be selectively fired into waste ink receptacle 28, while printhead carrier 32** remains in motion.

Figure 2A:
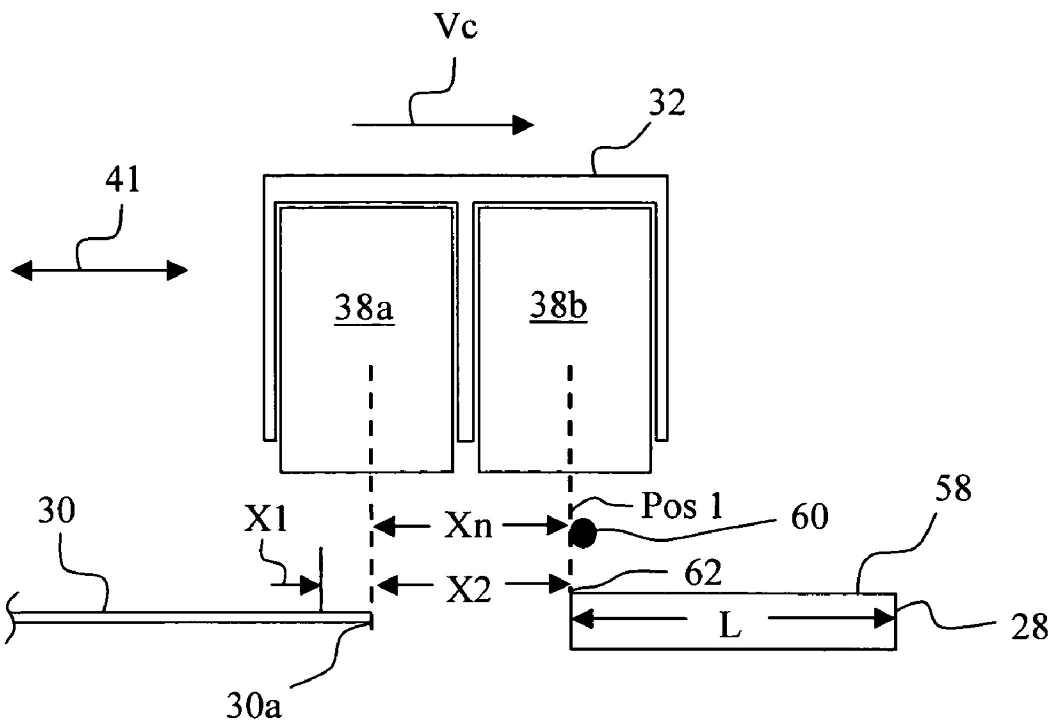
FIGS. 2A and 2B depict considerations that are made when locating the waste ink receptacle of FIG. 1.
Figure 2B:
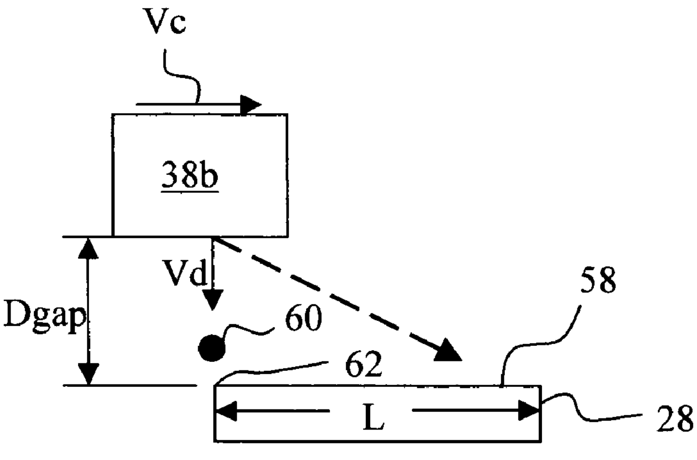

FIGS. 2A and 2B depict the considerations that are made when locating waste ink receptacle 28 with respect to an edge **30*a* of the sheet of print media 30. In order to allow printheads 38*a* and 38*b* to undergo dynamic printhead maintenance firing, i.e., while in motion, the waste ink receptacle 28 is located so as to allow for the ejected ink traveling horizontally at the carrier velocity (Vc) to reach the stationary target posed by waste ink receptacle 28. In other words, the momentum of ink droplets 60 will carry the ink droplets 60 horizontally along scan path 41** past the initial fire location.

To allow for the smallest possible width of ink jet printer 14, waste ink receptacle 28 is positioned such that it can be as close as possible to edge **30*a* of the sheet of print media 30. For example, edge 30*a* of the sheet of print media 30 may serve as a reference position in an edge-to-edge mode printing to locate waste ink receptacle 28 relative to the end of the print swath. As another example, a one-quarter inch margin of the sheet of print media 30 may serve as a reference position to locate waste ink receptacle 28** relative to the end of the print swath.

Referring to FIG. 2A, the distance from printhead **38*a* to printhead 38*b* is distance (Xn), the distance for the one-quarter inch margin of the sheet of print media 30 to edge 30*a* the sheet of print media 30 is distance (X1), and the distance from edge 30*a* the sheet of print media 30 to the center, e.g., center nozzle, of printhead 38*b* is distance (X2). Referring to FIG. 2B, also known are the gap distance (Dgap) from, for example, printhead 38*b* to the surface 58 of waste ink receptacle 28, and the droplet velocity (Vd) of the ink droplets 60. For example, the periodic maintenance firing for a one-quarter inch margin will begin when printhead 38*b* is in line with leading edge 62 of waste ink receptacle 28, which means that the nozzles for printhead 38*a* have completed printing at the one-quarter inch margin of the sheet of print media 30 and are at edge 30*a* of the sheet of print media 30. By moving printhead carrier 32 by distance (X1), the distance (Xn) between printhead 38*a* and printhead 38*b* puts the central nozzles of printhead 38*b* at the firing location (Pos 1), corresponding to leading edge 62 of waste ink receptacle 28**.

The length (L) of waste ink receptacle 28, which begins at a predetermined firing location (Pos 1), is determined by the droplet velocity (Vd) of the ink droplets 60 combined with the velocity (Vc) of printhead carrier 32, the number of spit fires per nozzle (N) and the resolution in drops per inch (Dpi), as represented by the formula:

$$L=[(Dgap/Vd)\times Vc]+(N/\mathrm{Dpi}).$$

This allows for ink droplets 60 to be contained within waste ink receptacle 28 having a length (L), after being fired from the printhead, e.g., printhead **38*b*, while traveling both vertically downward at velocity (Vd) and horizontally at carrier velocity (Vc), as depicted by the dashed arrow. Thus, when printing edge-to-edge, for example, the initial firing position for periodic maintenance would simply be firing location (Pos 1**), or in other words, immediately after completing printing of the print data for the current printing swath pass.

One skilled in the art will recognize that the width of ink jet printer 14 can thus be shortened by minimizing the length (L) of waste ink receptacle 28 at the maximum carrier velocity (Vc) that is possible during the deceleration of printhead carrier 32, assuming a constant droplet velocity (Vd), a constant gap distance (Dgap), a constant resolution (Dpi), and a given number of spit fires per nozzle (N).

Figure 3:
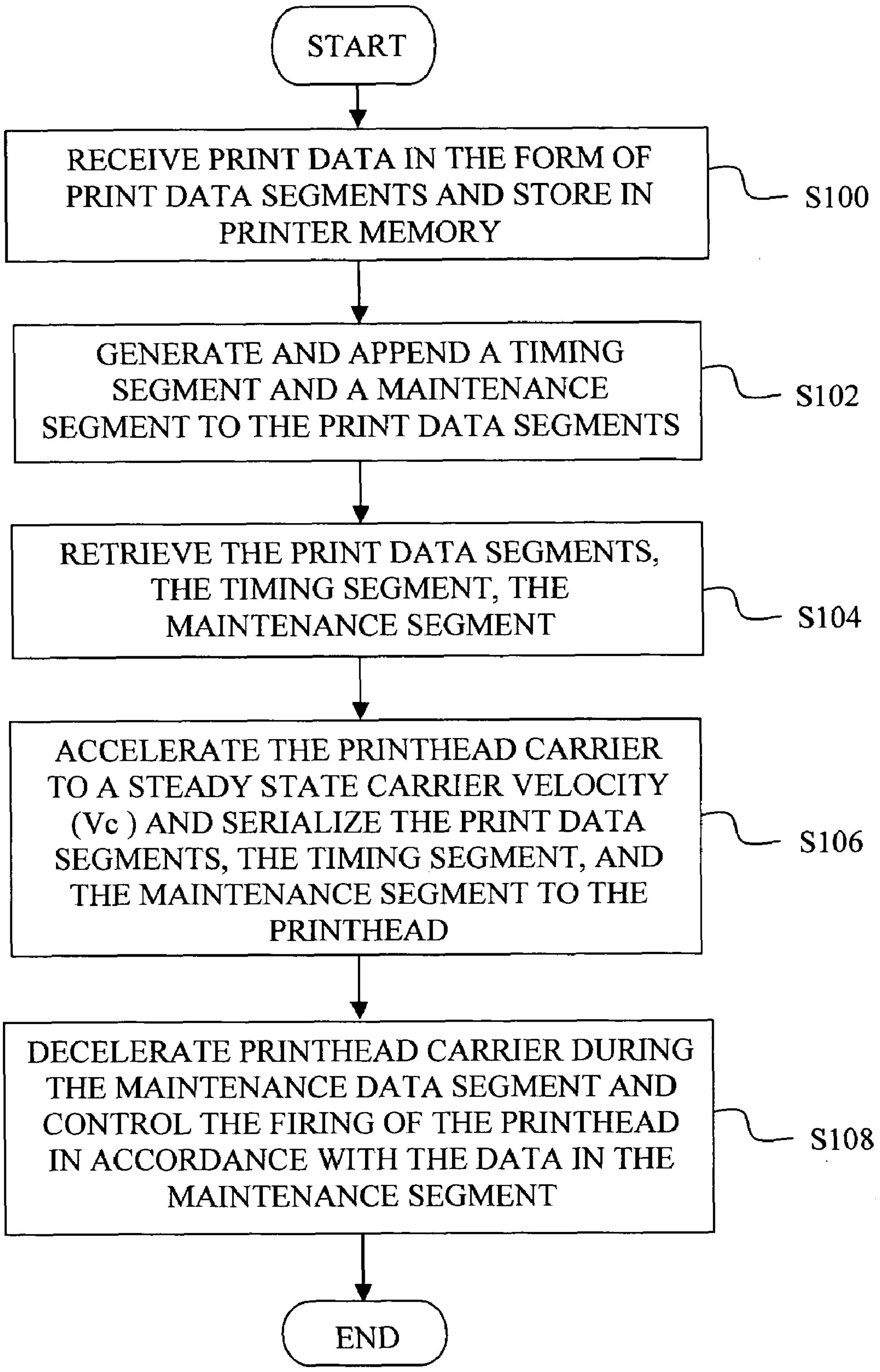
FIG. 3 is a flowchart of a method of performing dynamic printhead maintenance firing in accordance with the present invention.

Referring now to FIG. 3, there is shown a flowchart of a method of performing dynamic printhead maintenance firing in accordance with the present invention. The present method will allow for the printhead, such as printhead **38*b*, to fire at the appropriate time interval at the fixed location of waste ink receptacle 28 and consistently place all ink droplets 60 at surface 58 of waste ink receptacle 28, assuming waste ink receptacle 28** was positioned in accordance with the formula set forth above, without negatively affecting print quality.

At step S100, ink jet printer 14 receives print data in the form of print data segments, such as for example, from host 12 via communications link 16, or in the case of a multifunction apparatus operating, for example, in a copy mode, such print data segments may be self generated and internally received. The print data segments are then stored in memory of ink jet printer 14, such as for example, in the memory of controller 26.

Figure 4:
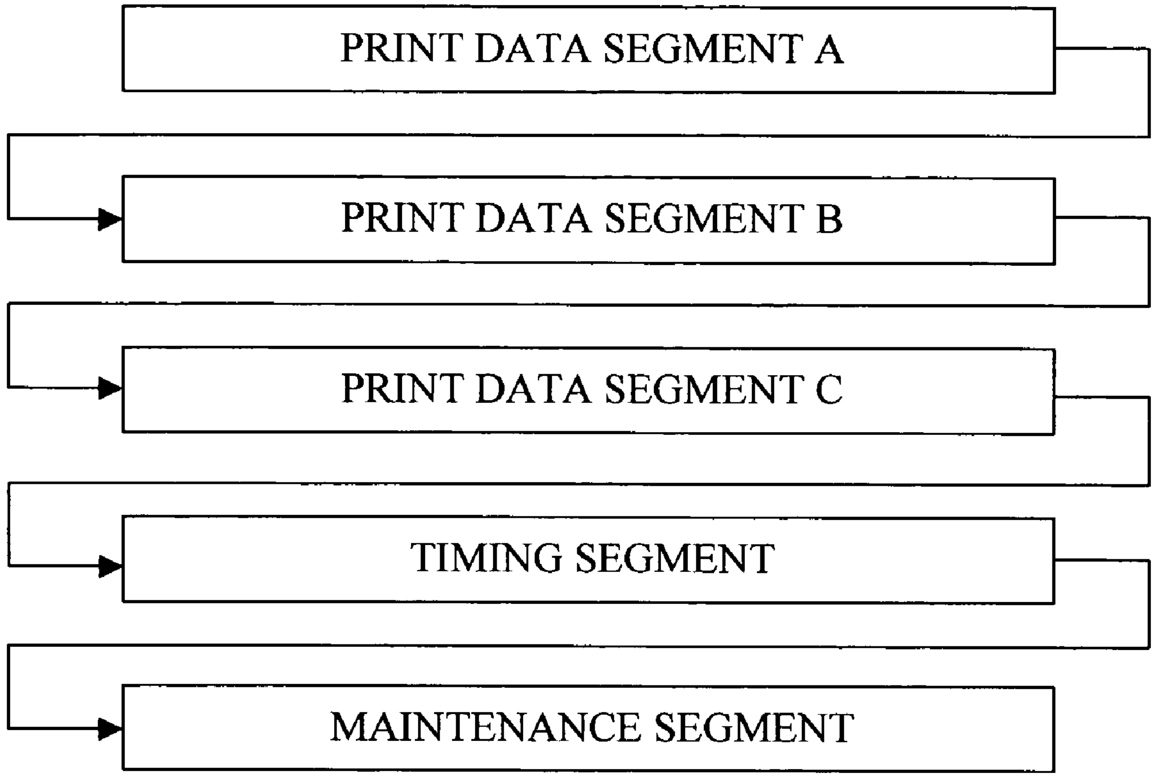
FIG. 4 illustrates a timing segment and a maintenance segment appended to print data segments, in accordance with the present invention.

At step S102, a timing segment and a maintenance segment are generated and appended to the print data segments, such as print data segments A, B and C, for the current print swath pass, as illustrated in FIG. 4. The timing segment and maintenance segment are appended to the print data segments in order to perform printhead spit maintenance while printhead carrier 32 is moving relative to the fixed location of waste ink receptacle 28. The timing segment contains no firing data, i.e., is all zeros, and therefore, requires no storage space in the memory of ink jet printer 14.

In order to force the printhead, such as printhead **38*b*, to fire over the fixed waste ink receptacle 28, firmware will calculate the required data length for the timing segment. The firmware may reside, for example, in controller 26**. For example, the firmware will use the amount of print data present in the print data segments, such as for example the print data segments A, B and C, for the current print swath pass to determine the required length of the timing segment.

At step S104, the print data segments (collectively referred to as print data), the timing segment, i.e., timing data, and the maintenance segment, i.e., maintenance data, are retrieved from the memory of ink jet printer 14.

Figure 5:
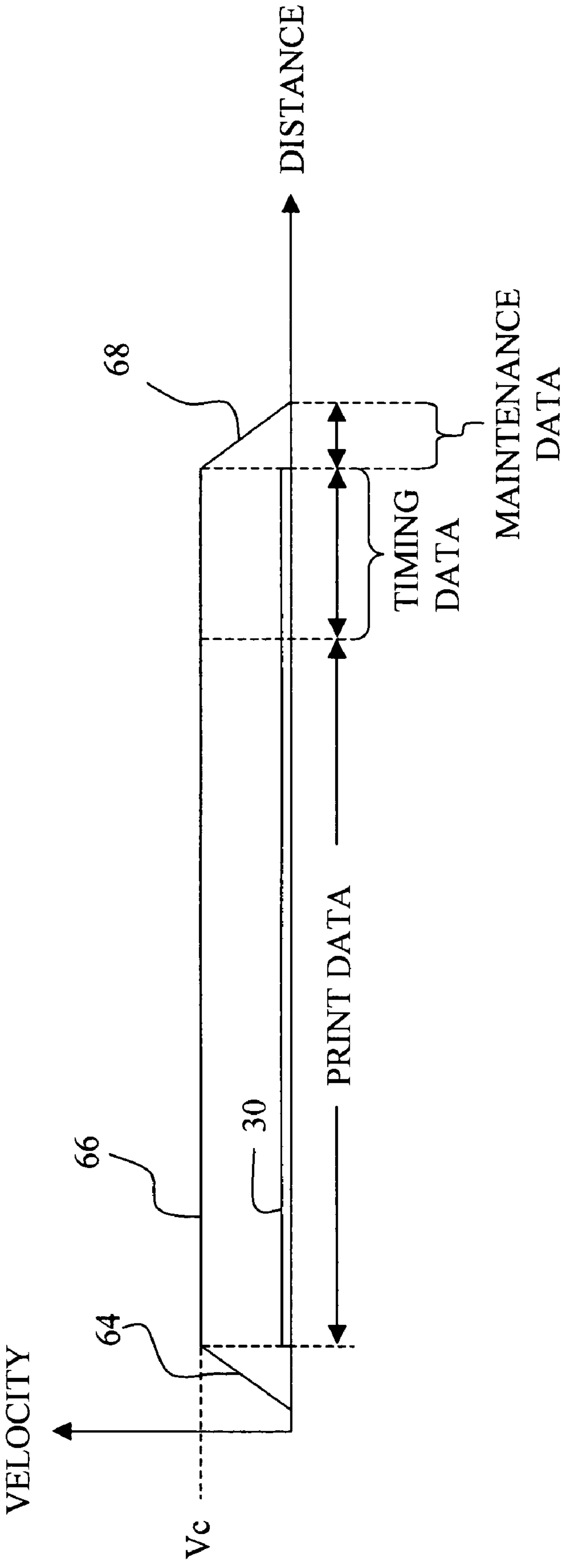
FIG. 5 is a graph illustrating the carrier velocity of the printhead carrier as the print data segments, timing segment, and maintenance segment are serialized to the printhead of the ink jet printer of FIG. 1.

At step S106, and with reference to FIGS. 1 and 5, printhead carrier 32 is accelerated during an acceleration ramp 64 to a steady state velocity 66, i.e., velocity (Vc), at which time the print data is printed on the sheet of print media 30.

During steps S104 and S106, the print data segments, timing segment and maintenance segment are retrieved from printer memory and are serialized to the printhead, such as printhead **38*b*, from the printer memory via a direct memory access (DMA) operation at intervals based, for example, on the encoder edges of an encoder strip (not shown) associated with printhead carrier 32 used to determine the relative position of printhead carrier 32. Controller 26 may serve, for example, as a DMA controller that handles segment transitions to ensure that a constant stream of data is serialized out to the printhead, such as printhead 38*b*, as printhead carrier 32 moves across the width of the sheet of print media 30, i.e., through print zone 56**.

During the timing segment, the DMA controller is placed in a special mode in which the data serialized to the printhead, such as printhead **38*b*, is all zeros. Therefore, no nozzles will fire and no ink will be placed on the sheet of print media 30 and/or mid-frame 22. Printhead carrier 32 will move at a constant carrier velocity (Vc) through the print data segments and timing data segment, as illustrated in FIG. 5**.

At step S108, printhead carrier 32 is decelerated along deceleration ramp 68 during the maintenance segment and the firing of the printhead, e.g., printhead **38*b*, is controlled in accordance with the data in the maintenance segment. Thus, during the maintenance segment, firing data is serialized to the printhead, e.g., printhead 38*b*, thereby selectively firing the nozzles of the printhead so as to perform spit maintenance on the printhead. Since printhead carrier 38 is not moving at a constant velocity when the maintenance data is serialized to the printhead, such as printhead 38*b***, the printhead nozzles will not fire at a constant frequency.

While the present invention has been described for simplicity and ease of understanding with respect to a single waste ink receptacle 28, it is contemplated that the principles of the present invention may be easily adapted to accommodate multiple maintenance locations, such as for example, where print zone 56 is located between two maintenance locations.

While this invention has been described with respect to a particular embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of performing printhead maintenance firing in an ink jet printer that has a printhead carrier that carries an ink jet printhead, said ink jet printer having a waste ink receptacle, comprising the steps of:

decelerating said printhead carrier from a first velocity after printing print data; and controlling a firing of said printhead during said decelerating in accordance with maintenance data so that ink droplets ejected from said printhead during said decelerating are received by said waste ink receptacle, said maintenance data being appended to said print data for a particular printing swath pass for serialization to said printhead; and wherein a timing segment is interposed between said print data and said maintenance data; and wherein a length (L) of said waste ink receptacle, which is positioned to begin at a predetermined location, is determined by the formula:

$$L=[(Dgap/Vd)\times Vc]+(N/Dpi), \text{ wherein:}$$

Dgap is a gap distance from said printhead to a surface of said waste ink receptacle;

Vd is a droplet velocity of ink droplets ejected from said printhead;

Vc is a carrier velocity of said printhead carrier;

N is the number of spit fires per nozzle; and

Dpi is the resolution.

2. The method of claim 1, said predetermined location being outside a print zone of said ink jet printer, and in relation to an edge of a sheet of print media.

3. The method of claim 1, said print data being printed at said carrier velocity Vc of said printhead carrier.

4. A method of performing printhead maintenance firing in an ink jet printer that has a printhead carrier that carries an ink jet printhead, said ink jet printer having a waste ink receptacle, comprising the steps of:

receiving print data in a form of print data segments;

generating a timing segment and a maintenance segment;

appending said timing segment and said maintenance segment to said print data segments;

accelerating said printhead carrier to a first velocity;

serializing said print data segments, said timing segment, and said maintenance segment to said printhead;

decelerating said printhead carrier during said maintenance segment; and controlling a firing of said printhead in accordance with data in said maintenance segment so that ink droplets ejected from said printhead during said decelerating are received by said waste ink receptacle, said print data segments and said timing segment being serialized to said printhead when said printhead carrier is moving at said first velocity.

5. A method of performing printhead maintenance firing in an ink jet printer that has a printhead carrier that carries an ink jet printhead, said ink jet printer having a waste ink receptacle, comprising the steps of:

receiving print data in a form of print data segments;

generating a timing segment and a maintenance segment;

appending said timing segment and said maintenance segment to said print data segments;

accelerating said printhead carrier to a first velocity;

serializing said print data segments, said timing segment, and said maintenance segment to said printhead;

decelerating said printhead carrier during said maintenance segment; and controlling a firing of said printhead in accordance with data in said maintenance segment so that ink droplets ejected from said printhead during said decelerating are received by said waste ink receptacle, wherein a length (L) of said waste ink receptacle, which is positioned to begin at a predetermined location, is determined by the formula:

$$L=[(Dgap/Vd)\times Vc]+(N/Dpi), \text{ wherein:}$$

Dgap is a gap distance from said printhead to a surface of said waste ink receptacle;

Vd is a droplet velocity of ink droplets ejected from said printhead;

Vc is a carrier velocity of said printhead carrier;

N is the number of spit fires per nozzle; and

Dpi is the resolution.

6. The method of claim 5, said predetermined location being outside a print zone of said ink jet printer, and in relation to an edge of a sheet of print media.

* * * * *